M. Mitchell,
Derrick.
N°60,773. Patented Jan.1, 1867.
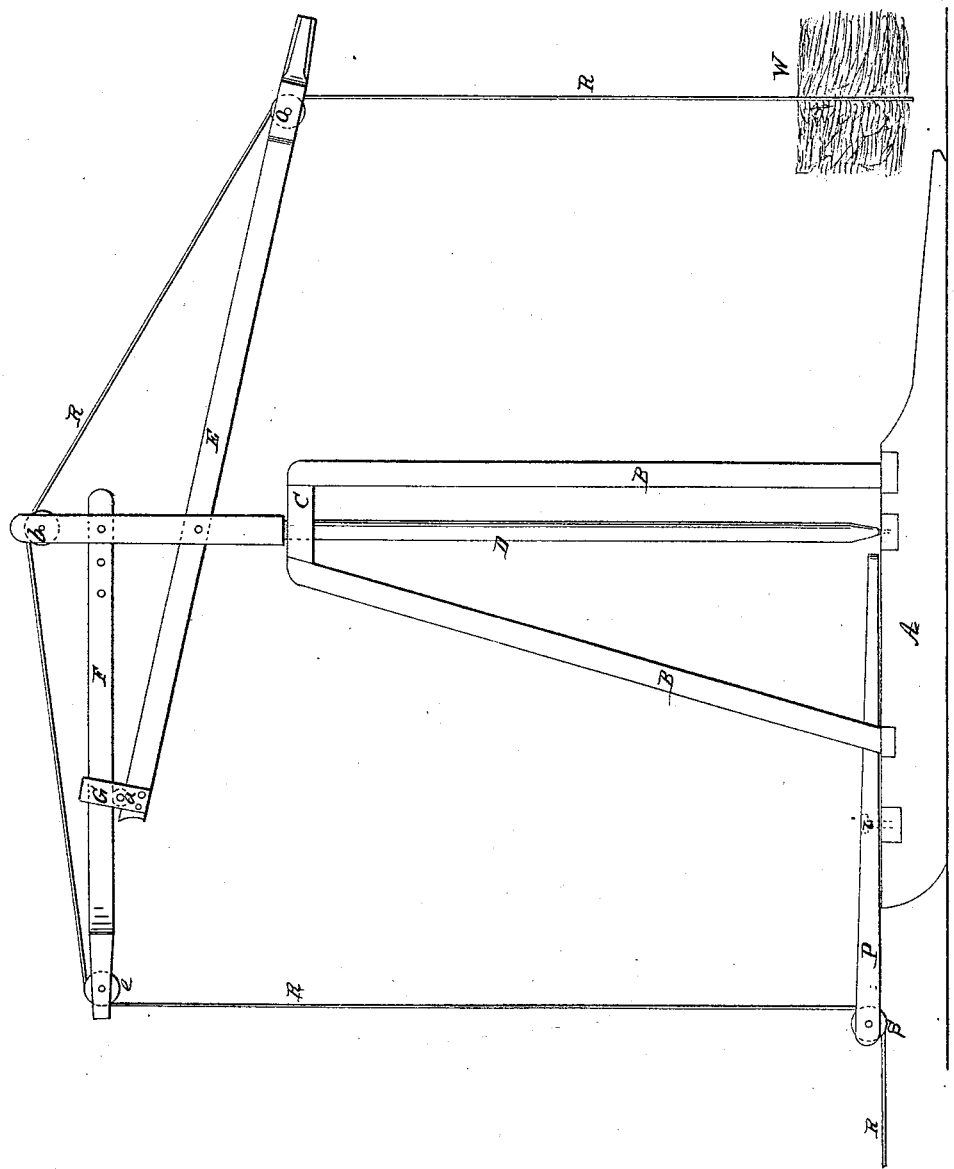

United States Patent Office.

MATTHEW MITCHELL, OF CROWN POINT, INDIANA.

Letters Patent No. 60,773, dated January 1, 1867.

IMPROVEMENT IN HAY ELEVATOR.

*The Schedule referred to in these Letters Patent and making part of the same.*

TO ALL WHOM IT MAY CONCERN:

Be it known that I, MATTHEW MITCHELL, of Crown Point, in the county of Lake, and State of Indiana, have invented a new and improved Revolving Hay Elevator; and I do hereby declare that the following is a full, clear, and exact description thereof, reference being had to the accompanying drawings, forming part of this specification.

This invention consists in the construction of a derrick in such a form as to admit its standing near a haystack, and a revolving upright shaft and levers arranged in such a manner that the hay can be elevated easy and expeditiously.

To enable others skilled in the art to make and use my invention, I will proceed to describe its construction and operation.

The figure is a side elevation of my improved hay elevator.

Letters of like name and kind refer to like parts in the figure.

A represents the side pieces of the bottom of the frame of my hay elevator, which are made of wood of suitable dimensions, and rounded up in front so that it may be moved or drawn from place to place. The rear ends are tapered or sharpened so that it may be run under the bottom of the stack, so as to bring the derrick to within a convenient distance. These side pieces, A, are bound or framed to cross-beams in such a manner as to make a strong frame. B B may represent four inclined posts, the foot of each being framed to the cross-beams that are framed to the side pieces, A. These posts, B, incline upward, and the top of each secured to a short beam, C, that runs in a longitudinal direction with the side pieces, A. D is an upright shaft that has a bearing in one of the cross-beams of the sides, A. The upper portion of this shaft has also a bearing in the short beam, C. In the top of this shaft, D, is a slot in which are secured, by pivot-bolts, the long and short levers, E and F. These levers, E and F, are connected together by a metallic strap, G, located upon the end of the lever E, the lever F passing through the said strap and resting upon a friction-roller, $a$, in the strap, G. $e$ is a pulley located at the end of the lever, F. $b$ is also a pulley in the upper end of the shaft, D. O is another pulley located near the end of the lever, E. P is a pivoted lever secured to the front cross-beam by a pivot-bolt, $i$, in the end of which is a pulley, S. R is a rope that passes under the pulley, S, upon the pulley, $e$, in the end of the lever, F, and over pulley, $b$, in the top of the shaft, D, and over the pulley, O, in the lever, E, and down to the hay, W. This lever, P, is made so that it will rotate upon the pivot, $i$, which at the same time rotates upon the shaft, D, and carries with it both levers, E and F, and by drawing the rope at pulley, S, the hay is elevated and deposited upon the stack.

Having thus described my invention, what I claim as new, and desire to secure by Letters Patent, is—

1. The shaft D, lever E, provided with the friction-roller $a$, in combination with the lever F, and rope R, for the purposes and substantially as described.

2. I claim the side pieces or frame A, and posts B, in combination with the levers E and F, and shaft D, substantially as herein described.

MATTHEW MITCHELL.

Witnesses:
    D. K. PETTIBONE,
    W. G. McGLASHON.